United States Patent
Ackermann et al.

(10) Patent No.: US 10,655,323 B2
(45) Date of Patent: May 19, 2020

(54) CONTACT LAYER WITH A SOLID FILLER COMPONENT

(71) Applicant: SIKA TECHNOLOGY AG, Baar (CH)

(72) Inventors: Herbert Ackermann, Tann (CH); Frank Hoefflin, Baden (CH); Roman Rohrer, Sarnen (CH); Lisa Gutjahr, Aschaffenburg (DE); Roy Z'Rotz, Ebikon (CH); Simon Schoenbrodt, Sarnen (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/061,899

(22) PCT Filed: Dec. 20, 2016

(86) PCT No.: PCT/EP2016/081977
§ 371 (c)(1),
(2) Date: Jun. 13, 2018

(87) PCT Pub. No.: WO2017/108826
PCT Pub. Date: Jun. 29, 2017

(65) Prior Publication Data
US 2018/0371745 A1    Dec. 27, 2018

(30) Foreign Application Priority Data

Dec. 23, 2015 (EP) .................... 15202467

(51) Int. Cl.
*E04B 1/66* (2006.01)
*B32B 21/12* (2006.01)
(Continued)

(52) U.S. Cl.
CPC .......... *E04B 1/665* (2013.01); *B28B 19/0046* (2013.01); *B32B 5/022* (2013.01); *B32B 5/16* (2013.01); *B32B 5/30* (2013.01); *B32B 7/12* (2013.01); *B32B 13/042* (2013.01); *B32B 13/047* (2013.01); *B32B 13/06* (2013.01); *B32B 13/10* (2013.01); *B32B 13/12* (2013.01); *B32B 13/14* (2013.01); *B32B 15/06* (2013.01); *B32B 15/082* (2013.01); *B32B 15/085* (2013.01); *B32B 15/09* (2013.01); *B32B 15/14* (2013.01); *B32B 15/16* (2013.01); *B32B 19/02* (2013.01); *B32B 19/04* (2013.01); *B32B 19/042* (2013.01); *B32B 19/045* (2013.01); *B32B 19/06* (2013.01); *B32B 21/02* (2013.01); *B32B 21/045* (2013.01); *B32B 21/08* (2013.01); *B32B 21/10* (2013.01); *B32B 21/12* (2013.01); *B32B 21/14* (2013.01); *B32B 25/10* (2013.01); *B32B 25/16* (2013.01); *B32B 27/12* (2013.01); *B32B 27/14* (2013.01); *B32B 27/20* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *C04B 26/04* (2013.01); *C04B 28/04* (2013.01); *C09J 1/00* (2013.01); *C09J 11/04* (2013.01); *B32B 2037/1246* (2013.01); *B32B 2260/025* (2013.01); *B32B 2260/046* (2013.01); *B32B 2260/048* (2013.01); *B32B 2262/0261* (2013.01); *B32B 2262/0276* (2013.01); *B32B 2262/101* (2013.01); *B32B 2264/10* (2013.01); *B32B 2264/104* (2013.01); *B32B 2307/538* (2013.01); *B32B 2307/7265* (2013.01); *B32B 2307/732* (2013.01); *B32B 2307/748* (2013.01); *B32B 2419/00* (2013.01);
(Continued)

(58) Field of Classification Search
CPC ........ E04B 1/665; B28B 19/0046; C09J 1/00; C09J 11/04; B32B 13/12; B32B 27/306; B32B 7/12; B32B 27/20; B32B 2419/06; B32B 2037/1246; B32B 2307/7265; C04B 2111/00612; C04B 2111/27; C04B 28/04; C04B 26/04
See application file for complete search history.

(56) References Cited

U.S. PATENT DOCUMENTS

| 5,543,188 A | 8/1996 | Te'eni |
| 5,663,218 A * | 9/1997 | Chappuis ............... B65D 81/02 106/646 |
| 6,761,504 B1 * | 7/2004 | Brandenberger ....... E21F 16/02 405/150.2 |

(Continued)

FOREIGN PATENT DOCUMENTS

| JP | H11-302051 A | 11/1999 | |
| WO | WO-2007054545 A2 * | 5/2007 | ............ C04B 14/42 |
| WO | 2011/139466 A1 | 11/2011 | |

OTHER PUBLICATIONS

Khatib, Sustainability of Construction Materials, Woodhead Publishing, 2nd Edition, p. 288 (Year: 2016).*

(Continued)

*Primary Examiner* — Brent W Herring
(74) *Attorney, Agent, or Firm* — Oliff PLC

(57) ABSTRACT

A contact layer used in waterproofing and roofing applications. The contact layer includes a solid filler component F and a thermoplastic polymer component P. Also directed to a method for producing the contact layer, to a method for binding two substrates to each other, to a method for waterproofing a substrate, to a waterproofed structure, to a method for sealing a surface against water penetration, to a sealed construction for sealing a substrate against water penetration and to use of the contact layer as waterproofing membrane.

23 Claims, 1 Drawing Sheet

(51) Int. Cl.
| | |
|---|---|
| *B32B 7/12* | (2006.01) |
| *B32B 13/12* | (2006.01) |
| *B32B 27/20* | (2006.01) |
| *B32B 27/30* | (2006.01) |
| *C04B 26/04* | (2006.01) |
| *C09J 1/00* | (2006.01) |
| *C09J 11/04* | (2006.01) |
| *B28B 19/00* | (2006.01) |
| *C04B 28/04* | (2006.01) |
| *B32B 27/12* | (2006.01) |
| *B32B 27/32* | (2006.01) |
| *B32B 5/02* | (2006.01) |
| *B32B 13/04* | (2006.01) |
| *B32B 13/10* | (2006.01) |
| *B32B 21/10* | (2006.01) |
| *B32B 15/06* | (2006.01) |
| *B32B 15/085* | (2006.01) |
| *B32B 25/16* | (2006.01) |
| *B32B 27/34* | (2006.01) |
| *B32B 19/04* | (2006.01) |
| *B32B 13/14* | (2006.01) |
| *B32B 21/02* | (2006.01) |
| *B32B 27/14* | (2006.01) |
| *B32B 13/06* | (2006.01) |
| *B32B 21/14* | (2006.01) |
| *B32B 19/02* | (2006.01) |
| *B32B 5/16* | (2006.01) |
| *B32B 19/06* | (2006.01) |
| *B32B 21/04* | (2006.01) |
| *B32B 15/14* | (2006.01) |
| *B32B 21/08* | (2006.01) |
| *B32B 15/082* | (2006.01) |
| *B32B 25/10* | (2006.01) |
| *B32B 15/09* | (2006.01) |
| *B32B 15/16* | (2006.01) |
| *B32B 5/30* | (2006.01) |
| *C04B 111/27* | (2006.01) |
| *C04B 111/00* | (2006.01) |
| *B32B 37/12* | (2006.01) |

(52) U.S. Cl.
CPC . *B32B 2419/06* (2013.01); *C04B 2111/00612* (2013.01); *C04B 2111/27* (2013.01)

(56) References Cited

U.S. PATENT DOCUMENTS

| | | | |
|---|---|---|---|
| 8,044,124 B2 * | 10/2011 | Hedouin | C04B 28/02 428/423.1 |
| 8,793,862 B2 | 8/2014 | Weber et al. | |
| 8,931,228 B2 * | 1/2015 | Wiercinski | E01D 19/083 52/408 |
| 9,950,954 B2 * | 4/2018 | Mikaelsson | C04B 28/04 |
| 2002/0132882 A1 * | 9/2002 | Hilton | B01F 5/0406 524/4 |
| 2003/0125404 A1 * | 7/2003 | Hilton | B28C 5/388 521/50 |
| 2003/0125405 A1 * | 7/2003 | Hilton | B28C 5/06 521/50 |
| 2004/0092614 A1 * | 5/2004 | Hilton | B28C 5/388 521/82 |
| 2005/0113492 A1 | 5/2005 | Bayer et al. | |
| 2007/0256600 A1 * | 11/2007 | Hedouin | C04B 28/02 106/696 |
| 2008/0193740 A1 * | 8/2008 | Nesbitt | B29C 44/0407 428/318.4 |
| 2009/0221202 A1 * | 9/2009 | Moller | C04B 14/42 442/180 |
| 2010/0028692 A1 * | 2/2010 | Hedouin | C04B 28/02 428/423.1 |
| 2012/0031308 A1 * | 2/2012 | Fradera Pellicer | C04B 28/065 106/784 |
| 2013/0066324 A1 * | 3/2013 | Engqvist | C04B 28/02 606/92 |
| 2013/0143023 A1 | 6/2013 | Herold et al. | |
| 2013/0279991 A1 * | 10/2013 | Kloster | E02D 29/16 405/232 |
| 2014/0087158 A1 | 3/2014 | Ciuperca | |
| 2014/0174325 A1 * | 6/2014 | Pardal | C04B 7/02 106/727 |
| 2015/0083658 A1 | 3/2015 | Schroer et al. | |
| 2015/0203409 A1 * | 7/2015 | Grisoni | C04B 28/02 524/5 |
| 2015/0231863 A1 | 8/2015 | Knebel et al. | |
| 2018/0327313 A1 * | 11/2018 | Kluj | C04B 28/145 |
| 2019/0242116 A1 * | 8/2019 | Lee | B32B 5/02 |

OTHER PUBLICATIONS

Focht, Types of Masonry Binders, website <https://limeworks.us/blog/types-masonry-binders/> (Year: 2019).*

Apr. 12, 2017 International Search Report issued in International Patent Application No. PCT/EP2016/081977.

Apr. 12, 2017 Written Opinion issued in International Patent Application No. PCT/EP2016/081977.

"Kunststoff Verarbeitung;" by Schwarz, Ebeling and Furth; 10th Edition 2005; Vogel Buchverlag; Chapters 3 and 5; pp. 23-28 and 59-60.

* cited by examiner

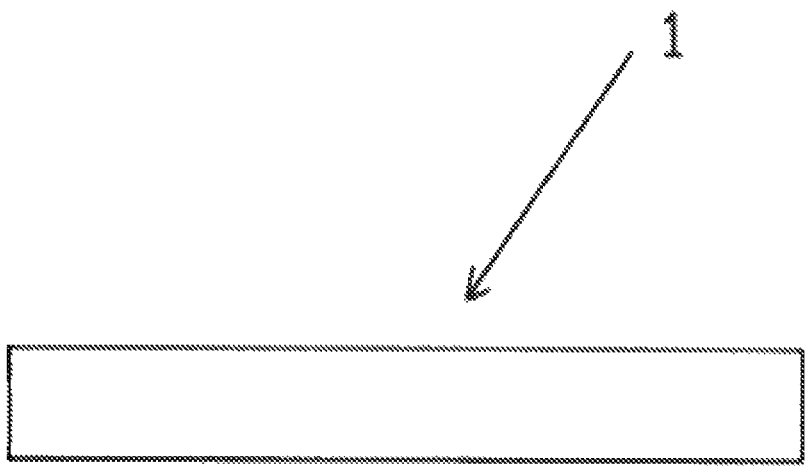

CONTACT LAYER WITH A SOLID FILLER COMPONENT

TECHNICAL FIELD

The invention relates to contact layers for use in the construction industry, for example for basements, roofing and tunneling applications to protect concrete structures against water penetration.

BACKGROUND OF THE INVENTION

Waterproofing membranes are commonly used in the construction industry for sealing bases, underground surfaces or buildings against water penetration.

State-of-the-art waterproofing membranes are multilayer systems comprising a polymer-based barrier layer as the principal layer to provide watertightness. Typical polymers used in barrier layers include thermoplastics such as plasticized polyvinylchloride (p-PVC) and thermoplastic polyolefins (TPO) or elastomers such as ethylene-propylene diene monomer (EPDM) and crosslinked chlorosulfonated polyethylene (CSPE). One of the drawbacks of polymer-based barrier layers is their poor bonding properties; they typically show low bonding strength to adhesives that are commonly used in the construction industry, such as epoxy adhesives, polyurethane adhesives, and cementitious compositions. Therefore, a contact layer, for example, a fleece backing, is typically used to provide sufficient bonding of the polymer-based barrier layer and the structure to be waterproofed.

One of the main challenges related to the multilayer waterproofing membranes is to ensure watertightness after infiltration in case of leak in the barrier layer. Watertightness after infiltration means in general that the sealing construction should be able to prevent the infiltrated water from penetrating to the space between the membrane and the waterproofed surface. A leak in the barrier layer can be a result of inward growing tree roots, material failure or tensile or shear forces directed to the membrane. If the watertightness after infiltration is lost, water is able to flow laterally underneath the membrane and to invade the interior of the building structure. In such cases the exact location of the leak in the barrier layer is also difficult to detect.

U.S. Pat. No. 8,793,862B2 describes a waterproofing membrane comprising a barrier layer, a composite layer arranged on one side of the barrier layer and a network of sealant between the barrier layer and the composite layer. The network of sealant is said to limit the size of area affected by penetrating water in case of water leakage in the barrier layer. In waterproofing applications the membrane is applied on a subsurface in such way that the barrier layer is directed against a concrete base and the composite layer is facing the concrete casted against the membrane. During the hardening process, the composite layer is penetrated by the liquid concrete forming a good bond with the hardened concrete.

US2015/0231863A1 discloses a waterproofing membrane including a barrier layer and a functional layer including a thermoplastic polymer that changes consistency under influence of highly alkaline media and an adhesive. Once the functional layer gets into contact with liquid concrete, the thermoplastic polymer dissolves and allows the adhesive to bond to the cast concrete. The functional layer may additionally comprise other thermoplastic polymers, fillers or concrete constituents. The construction of the functional layer is said to enable working with membranes in adverse weather conditions without diminishing the adhesive capacity of the membrane.

One disadvantage of state-of-the-art multilayer waterproofing membranes is related to the use of adhesives, which increases the complexity of the membrane build-up and consequently the production costs of such membranes. The adhesive has to provide good binding to the low surface energy polymers in the barrier layers, form a strong bond to the contact layer and to fresh concrete and have a good resistance to varying temperature ranges, UV irradiation and oxidation. Adhesives fulfilling all the requirements, if available at all, are expensive and thus increase the production cost of such membranes by a significant amount.

Another disadvantage of state-of-the-art multilayer waterproofing membranes is related to the use of fleece backings as contact layer to provide sufficient bonding between the membrane and the substrate to be waterproofed. In waterproofing and roofing applications the adjacent membrane sheets have to be homogenously joined to each other in a reliable way to ensure watertightness of the sealing construction. Membranes having a fleece backing cannot be joined by heat welding but instead the edges of the membranes have to be bonded together either with an adhesive or with a sealing tape adhered on top of the seam and/or under the seam. The use of an adhesive or a sealing tape to join adjacent membrane sheets complicates the installation process and increases application costs.

SUMMARY OF THE INVENTION

The objective of the present invention is to provide a contact layer, which can be bonded to a thermoplastic layer without the use of adhesives.

Another objective is to provide a contact layer, which fully and permanently bonds to concrete and other cementitious compositions after hardening without the use of adhesives.

Still another objective of the present invention is to provide a contact layer, which has a good heat welding properties.

According to the invention, the aforementioned objectives are achieved with the contact layer according to claim 1.

The main concept of the invention is that the contact layer comprises a solid filler component and a thermoplastic polymer component, wherein the amount of the solid filler component is at least 10.0 wt.-%, based on the total weight of the contact layer. The combination of the solid filler component and the thermoplastic polymer component enables the contact layer to be bonded with thermoplastic layers and to form full permanent bond to concrete and to other cementitious compositions after hardening.

One of the advantages of the present invention is that the contact layer can be bonded to thermoplastic layers and to cementitious compositions without the use of adhesives. This enables the use of waterproofing and roofing membranes, which have simple built-up and which can thus be produced with lower costs compared to state-of-the-art membranes.

Another advantage of the present invention is that the contact layer has good heat welding properties, which means that adjacent contact layers or thermoplastic membranes comprising a contact layer can be homogeneously joined by heat welding instead of using an adhesive or sealing tape to bond overlapping membrane sheets.

In another aspect of the present invention there is provided a method for producing a contact layer, a method for binding to substrates together, a method for waterproofing a substrate, a waterproofed construction, a method for sealing a substrate, a sealed construction and use of a contact layer.

BRIEF DESCRIPTION OF THE DRAWING

The FIGURE is an illustration of the contact layer.

DETAILED DESCRIPTION OF THE INVENTION

The term "polymer" designates a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "polymer component" designates polymer compositions comprising one or more polymers.

The term "inert mineral fillers" designates mineral fillers that are not chemically reactive. They are produced from natural mineral sources by mining followed by comminution to required particle size and shape. In particular, inert mineral fillers include sand, calcium carbonate, crystalline silicas, dolomite, clay, talc, mica, Wollastonite, barite, perlite, diatomaceous earth, pumice, and vermiculite.

By calcium carbonate as mineral filler is understood in the present document calcitic fillers produced from chalk, limestone or marble by grinding and/or precipitation.

The term "sand" designates mineral clastic sediments (clastic rocks) which are loose conglomerates (loose sediments) of round or angular small grains, which were detached from the original grain structure during the mechanical and chemical degradation and transported to their deposition point, said sediments having an $SiO_2$ content of greater than 50 wt.-%, in particular greater than 75 wt.-%, particularly preferably greater than 85 wt.-%.

The term "mineral binder" designates a binder, which in the presence of water reacts in a hydration reaction under formation of solid hydrates or hydrate phases. In particular, the term "mineral binder" refers to non-hydrated mineral binders, i.e. mineral binders, which have not been mixed with water and reacted in a hydration reaction.

The term "hydraulic binder" designates substances that harden as a result of chemical reactions with water ("hydration reactions") and produce hydrates that are not water-soluble. In particular, the hydration reactions of the hydraulic binder take essentially place independently of the water content. This means that hydraulic binders can harden and retain their strength even when exposed to water, for example underwater or under high humidity conditions. Examples of hydraulic binders include cement, cement clinker and hydraulic lime. In contrast, "non-hydraulic binders" such as air-slaked lime (non-hydraulic lime) and gypsum, are at least partially water soluble and must be kept dry in order to retain their strength.

The term "gypsum" designates any known form of gypsum, in particular calcium sulfate dehydrate, calcium sulfate α-hemihydrate, calcium sulfate β-hemihydrate, or calcium sulfate anhydrite or mixtures thereof.

The term "latent hydraulic binders" designates particular type II concrete additives with latent hydraulic character according to DIN EN 206-1:2000. These materials are calcium aluminosilicates that are not able to harden directly or harden too slowly when mixed with water. The hardening process is accelerated in the presence of alkaline activators, which break the chemical bonds in the binder's amorphous (or glassy) phase and promote the dissolution of ionic species and the formation of calcium aluminosilicate hydrate phases. Examples of latent hydraulic binders include granulated blast furnace slag.

The term "pozzolanic binders" designates in particular type II concrete additives with pozzolanic character according to DIN EN 206-1:2000. These materials are siliceous or aluminosilicate compounds that react with water and calcium hydroxide to form calcium silicate hydrate or calcium aluminosilicate hydrate phases. Pozzolanic binders include natural pozzolans such as trass and artificial pozzolans such as fly ash and silica fume.

The term "cement" designates ground hydraulic binders, which apart from the hydraulic binders as the main constituents, usually contain small quantities of calcium sulfate (gypsum and/or hemihydrate and/or anhydrite), and optionally secondary constituents and/or cement additives such as grinding aids. The main constituents are contained in quantities of more than 5% by weight. The main constituents can be Portland cement clinker, also referred to as clinker or cement clinker, slag sand, natural or artificial pozzolans, fly ash, for example, siliceous or calcareous fly ash, burnt shale, limestone and/or silica fume. As secondary constituents, the cements can contain up to 5% by weight of finely divided inorganic, mineral substances, which originate from clinker production.

The term "cementitious composition" designates concrete, shotcrete, grout, mortar, paste or a combination thereof. The terms "paste", "mortar", "concrete", "shotcrete", and "grout" are well-known terms in the state-of-the-art. Pastes are mixtures comprising a hydratable cement binder, usually Portland cement, masonry cement, or mortar cement. Mortars are pastes additionally including fine aggregate, for example sand. Concrete are mortars additionally including coarse aggregate, for example crushed gravel or stone. Shotcrete is concrete (or sometimes mortar) conveyed through a hose and pneumatically projected at high velocity onto a surface. Grout is a particularly flowable form of concrete used to fill gaps. The cementitious compositions can be formed by mixing required amounts of certain components, for example, a hydratable cement, water, and fine and/or coarse aggregate, to produce the particular cementitious composition.

The term "fresh cementitious composition" or "liquid cementitious composition" designate cementitious compositions before hardening, particularly before setting.

The present invention relates in a first aspect of the invention to a contact layer, for example, contact layer 1 illustrated in the Figure, comprising a solid filler component F and a thermoplastic polymer component P, wherein the amount of the solid filler component F is 10.0-90.0 wt.-%, preferably 15.0-80.0 wt.-%, more preferably 20.0-75.0 wt.-%, most preferably 25.0-70.00 wt.-% based on the total weight of the contact layer. Particularly, the amount of the solid filler component F is 30.0-70.0 wt.-%, preferably 35.0-70.0 wt.-%, most preferably 35.0-65.0 wt.-%, based on the total weight of the contact layer.

The contact layer is typically a sheet-like element having top and bottom surfaces (first and second surfaces of the contact layer) defined by peripheral edges.

Preferably, the thermoplastic polymer component P has a melting point of 25-250° C., preferably 55-225° C., more preferably 60-200° C., most preferably 65-150° C. Contact layers with the melting point of the thermoplastic polymer component P in the above mentioned ranges were found to provide particularly good concrete adhesion strengths.

The term "melting point" refers to the maximum of the curve determined according to ISO 11357 standard by means of dynamic differential calorimetry (DSC). At the melting point the material undergoes transition from the solid to the liquid state. The measurement can be performed with a Mettler Toledo 822e device at a heating rate of 2 degrees centigrade/min. The melting point values can be determined from the measured DSC curve with the help of the DSC software.

The solid filler component F is preferably dispersed throughout, preferably uniformly, the thermoplastic polymer component P in the contact layer to ensure that the properties of the contact layer do not change considerably along the length of the layer.

The filler component F is preferably present in the contact layer as a discontinuous particle based phase, which is dispersed in a continuous phase of the thermoplastic polymer component P. Preferably, the contact layer has concrete adhesion strength of at least 5 N/50 mm, more preferably at least 10 N/50 mm, even more preferably of at least 15 N/50 mm, even more preferably of at least 20 N/50 mm, most preferably of at least 30 N/50 mm. In particular, the contact layer has concrete adhesion strength of at least 40 N/50 mm, preferably of at least 45 N/50 mm, more preferably of at least 50 N/50 mm, even more preferably of at least 55 N/50 mm, most preferably of at least 60 N/50 mm.

Preferably, the contact layer has concrete adhesion strength in the range of 10-400 N/50 mm, more preferably of 15-350 N/50 mm, even more preferably of 20-300 N/50 mm, most preferably of 30-250 N/50 mm.

The term "concrete adhesion strength of a contact layer" refers to the average peel resistance [N/mm] per unit width of the contact layer upon peeling the contact layer from a surface of a concrete specimen, which has been casted on the surface of the contact layer and hardened for 28 days under standard atmosphere (air temperature 23° C., relative air humidity 50%).

In the context of the present invention, the concrete adhesion strength of a contact layer is determined using the measurement method described below.

Method for Determining the Concrete Adhesion Strength of a Contact Layer

For the determination of the concrete adhesion strength, the contact layer is bonded to a polyethylene-based barrier layer WT 1210 HE available form Sika to obtain a test membrane, which can be used in measuring the average peel resistance from a hardened concrete specimen. The thickness of the barrier layer is approximately 0.5 mm. The barrier layer can be bonded to the contact layer by welding or by adhesion with any adhesive suitable for the purpose, such as Sikadur-31 CF available from Sika.

For the measurement of the average peel resistance, a concrete test specimen having a sample of the test membrane adhered on its surface is first prepared.

A sample membrane with a dimension of 200 mm (length)×50 mm (width) is first cut from the test membrane. One edge of the sample membrane on the side of the contact layer is covered with an adhesive tape having a length of 50 mm and a width coinciding with the width of the sample membrane to prevent the adhesion to the hardened concrete. The adhesive tapes are used to provide easier installation of the concrete test specimens to the peel resistance testing apparatus. The sample membrane is placed into a formwork having a dimension of 200 mm (length)×50 mm (width)×30 mm (height) with the contact layer of the sample membrane facing upwards and the barrier layer against the bottom of the formwork.

For the preparation of the concrete specimen, a fresh concrete formulation is prepared by mixing 92.06 wt.-% of a concrete dry batch of type MC 0.45 with 7.73 wt.-% of water and 0.21 wt.-% of Sikament-12S for five minutes in a tumbling mixer. The concrete dry batch of type MC 0.45 contains 17.21 wt.-% of CEM I 42.5 N cement (preferably Normo 4, Holcim) and 74.84 wt.-% of aggregates containing 3.0 wt.-% of Nekafill-15 (from KFN) concrete additive (limestone filler), 24.0 wt.-% of sand having a particle size of 0-1 mm, 36.0 wt.-% of sand having a particle size of 1-4 mm, and 37 wt.-% of gravel having a particle size of 4-8 mm. Before blending with water and Sikament-12S the concrete dry batch is homogenized for five minutes in a tumbling mixer.

The formwork containing the sample membrane is subsequently filled with the fresh concrete formulation and vibrated for two minutes to release the entrapped air. After hardening for one day the concrete specimen is stripped from the formwork and stored under standard atmosphere (air temperature 23° C., relative air humidity 50%) for 28 days before measuring the average peel resistance.

The average peel resistance upon peeling the sample membrane from the surface of the concrete specimen is measured using a Zwick Roell AllroundLine Z010 material testing apparatus equipped with a Zwick Roell 90°-peeling device or using a similar testing apparatus fulfilling the requirements of the DIN EN 1372 standard.

In the peel resistance measurement, the concrete specimen is clamped with the upper grip of the material testing apparatus for a length of 10 mm at the end of the concrete specimen comprising the taped section of the sample membrane. Following, the sample membrane is peeled off from the surface of the concrete specimen at a peeling angle of 90° and at a constant cross beam speed of 100±10 mm/min. During the peel resistance measurement the distance of the rolls is preferably approximately 570 mm. The peeling of the sample membrane is continued until a length of approximately 140 mm of the sample membrane is peeled off from the surface of the concrete specimen. The average peel resistance is calculated as average peel force per unit width of the membrane [N/50 mm] during peeling over a length of approximately 70 mm thus excluding the first and last quarter of the total peeling length from the calculation.

The solid filler component F is preferably selected from the group consisting of organic fillers, inert mineral fillers and mineral binders and mixtures thereof. Particularly, the solid filler component F is selected from the group consisting of inert mineral fillers and mineral binders and mixtures thereof.

According to one embodiment, the solid filler component F consists of inert mineral filler. The inert mineral filler is preferably selected from the group consisting of sand, calcium carbonate, crystalline silicas, dolomite, clay, talc, mica, Wollastonite, barite, perlite, diatomaceous earth, pumice, and vermiculite, and mixtures thereof.

Preferably, the solid filler component F comprises at least one mineral binder selected from the group consisting of hydraulic, non-hydraulic, latent hydraulic, pozzolanic binders, and mixtures thereof. The solid filler component F can further comprise inert mineral fillers such as sand, calcium carbonate, crystalline silicas or talc. Preferably the solid filler component F contains at least 60.0 wt.-%, more preferably at least 70.0 wt.-%, even more preferably at least 80.0 wt.-%, most preferably at least 90.0 wt.-% of mineral binders.

The solid filler component F preferably comprises a hydraulic binder, in particular cement or cement clinker. The solid filler component F can further comprise latent hydraulic and/or pozzolanic binders, preferably slag and/or fly ash. According to one embodiment, the solid filler component F contains 5.0-50.0 wt.-%, preferably 5.0-40.0 wt.-%, more preferably 5.0-30.0 wt.-% of latent hydraulic and/or pozzolanic binders, preferably slag and/or fly ash and at least 35.0 wt.-%, more preferably at least 65.0 wt.-% of hydraulic binder, preferably cement or cement clinker.

Preferably, the solid filler component F is a hydraulic binder, preferably cement.

The cement can be any conventional cement, for example, one in accordance with the five main cement types according to DIN EN 197-1: namely, Portland cement (CEM I), Portland composite cements (CEM II), blast-furnace cement (CEM III), pozzolan cement (CEM IV) and composite cement (CEM V). These main cement types are subdivided, depending on the amount added, into an additional 27 cement types, which are known to the person skilled in the art and listed in DIN EN 197-1. Naturally, all other cements that are produced according to another standard are also suitable, for example, according to ASTM standard or Indian standard. To the extent that reference is made here to cement types according to DIN standard, this naturally also relates to the corresponding cement compositions which are produced according to another cement standard.

The solid filler component F is preferably in the form of finely divided particles, in order to obtain a contact layer with uniform surface properties. The term "finely divided particles" refers to particles, whose median particle size $d_{50}$ does not exceed 500 μm. The term median particle size $d_{50}$ refers to a particle size below which 50% of all particles by volume are smaller than the $d_{50}$ value.

The term "particle size" refers to the area-equivalent spherical diameter of a particle. The particle size distribution can be measured by laser diffraction according to the method as described in standard ISO 13320:2009. For determination of the particle size distribution, the particles are suspended in water (wet dispersion method). A Mastersizer 2000 device (trademark of Malvern Instruments Ltd, GB) can be used in measuring particle size distribution.

Preferably the median particle size $d_{50}$ of the solid filler component F is 1.0-300.0 μm, more preferably 1.5-250.0 μm, even more preferably 2.0-200.0 μm, most preferably 2.0-150.0 μm.

Preferably, less than 40 wt-%, more preferably less than 30 wt.-%, even more preferably less than 20-wt.-%, most preferably less than 10 wt.-% of the particles of the solid filler component F have a particle size of less than 5 μm and preferably less than 40 wt.-%, more preferably less than 30 wt.-%, even more preferably less than 20-wt.-%, most preferably less than 10 wt.-% of the particles of the solid filler component F have a particle size of above 100 μm.

Preferably, the overall particle size of the solid filler component F (of at least 98 percent of the particles) is below 250 μm, more preferably below 200 μm, even more preferably below 100 μm.

Increasing the amount of the thermoplastic polymer component P in the contact layer increases the strength of adhesion by which a contact layer is bonded to thermoplastic layers. However, increasing the amount of the thermoplastic polymer component P over a certain limit tends decrease the concrete adhesion strength of the contact layer.

Preferably, the amount of the thermoplastic polymer component P is 10.0-90.0 wt.-%, more preferably 15.0-80.0 wt.-%, even more preferably 20.0-75.0 wt.-%, most preferably 25.0-70.0 wt.-%, based on the total weight of the contact layer. Particularly, the amount of the thermoplastic polymer component P is 30.0-70.0 wt.-%, preferably 35.0-70.0 wt.-%, most preferably 35.0-65.0 wt.-%, based on the total weight of the contact layer.

Any kind of thermoplastic polymer component is in principle suitable to be used in the composition. Preferably, the thermoplastic polymer component P comprises at least one polymer selected from the group consisting of ethylene-vinyl acetate copolymer (EVA), ethylene-acrylic ester copolymers, ethylene-α-olefin co-polymers, ethylene-propylene co-polymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), polyisobutylene (PIB), and mixtures thereof.

Preferably the thermoplastic polymer component P comprises at least one polymer selected from the group consisting of low-density polyethylene, linear low-density polyethylene, high-density polyethylene, ethylene-vinyl acetate copolymer, ethylene-acrylic ester copolymers, ethylene-α-olefin co-polymers, and ethylene-propylene co-polymers.

The thermoplastic polymer component P may have a Young's modulus measured according to ISO 527-3 standard at a temperature of 23° C. of not more than 1000 MPa, more preferably not more than 750 MPa, even more preferably not more than 500 MPa, most preferably not more than 450 MPa. In particular, the thermoplastic component P may have a Young's modulus measured according to ISO 527-3 standard at a temperature of 23° C. in the range from 50 to 1000 MPa, preferably from 50 to 750 MPa, more preferably from 100 to 750 MPa, most preferably from 100 to 700 MPa. Contact layers containing a thermoplastic polymer component P having a Young's modulus at the above mentioned ranges were found to provide good concrete adhesion strengths.

Preferably, the thermoplastic polymer component P has a Young's modulus measured according to ISO 527-3 standard at a temperature of 23° C. of less than 150 MPa, more preferably less than 100 MPa, most preferably less than 50 MPa. Contact layers with the thermoplastic polymer component P having a Young's modulus at the above mentioned ranges were found to provide particularly high concrete adhesion strengths.

The properties of the contact layer were found especially suitable when the thermoplastic polymer component P comprises at least one ethylene-vinyl acetate copolymer, preferably having a content of a structural unit derived from vinyl acetate (hereinafter referred to as "vinyl acetate unit") of at least 7.0 wt.-%, more preferably at least 30.0 wt.-%, even more preferably at least 35.0 wt.-%, most preferably at least 40.0 wt.-%.

Preferably, the at least one ethylene-vinyl acetate copolymer has a content of vinyl acetate unit in the range from 7.0 wt.-% to 90.0 wt.-%, more preferably from 7.0 to 80.0 wt.-%, most preferably from 7.0 to 70.0 wt.-%.

Preferably, the amount of the at least one ethylene-vinyl acetate co-polymer is at least 5.0 wt.-%, more preferably at least 10.0 wt.-%, most preferably at least 15.0 wt.-%, based on the total weight of the thermoplastic polymer component P. In particular, the amount of the at least one ethylene-vinyl acetate co-polymer is in the range from 5.0 wt.-% to 90.0 wt.-%, preferably from 10.0 to 90.0 wt.-%, more preferably from 15.0 to 80 wt.-%, most preferably from 15.0 to 70.0 wt.-%.

The amount of the at least one ethylene-vinyl acetate co-polymer, preferably having a content of vinyl acetate unit of at least 7.0 wt.-%, more preferably at least 30.0 wt.-%, is preferably at least 30.0 wt.-%, more preferably at least 35.0 wt.-%, even more preferably at least 40.0 wt.-%, most preferably at least 50.0 wt.-%, based on the total amount of the thermoplastic polymer component P.

The glass transition temperature ($T_g$) of the thermoplastic polymer component P is preferably below the temperatures occurring during the use of the contact layer. It is therefore preferred that the $T_g$ of the thermoplastic polymer component P is below 0° C., more preferably below −15° C., most preferably below −30° C.

The term "glass transition temperature" refers to the temperature measured by DSC according to ISO 11357 standard above which temperature a polymer component becomes soft and pliable, and below which it becomes hard and glassy. The measurements can be performed with a Mettler Toledo 822e device at a heating rate of 2 degrees centigrade/min. The $T_g$ values can be determined from the measured DSC curve with the help of the DSC software.

The contact layer can comprise, in addition to the solid filler component F, the thermoplastic polymer component P, additives such as UV- and heat stabilizers, plasticizers, foaming agents, dyes, colorants, pigments, matting agents, antistatic agents, impact modifiers, flame retardants, and processing aids such as lubricants, slip agents, antiblock agents, and denest aids.

It was surprisingly found that the concrete adhesion strength of a contact layer depends at least partly on the surface roughness of the contact layer. The term "roughness" designates unevenness of a surface, which is quantified with three-dimensional (3D) surface roughness parameters defined according to ISO 25178 standard. The 3D-surface roughness parameters are calculated based on a surface geometry determined with an optical measurement method.

The following 3D-surface roughness parameters defined according to ISO 25178 standard for the surface of a contact layer were found to correlate with the concrete adhesion strength of the contact layer: root mean square roughness (Sq), average roughness (Sa), and maximum height of the surface (Sz).

The average roughness (Sa) and the root mean square roughness (Sq) represent an overall measure of the unevenness of the surface. They are relatively insensitive in differentiating peaks, valleys, and the spacing of the various texture features.

Maximum height of the surface (Sz) is calculated as difference between maximum peak height (Sp) and maximum valley depth (Sv). The maximum peak is the height of the highest point and maximum valley depth is the depth of the lowest point of the surface.

In the context of the present invention, the root mean square roughness (Sq), the average roughness (Sa), and the maximum height of the surface (Sz) for the surface of a contact layer are determined using the measurement method described below.

Method for Determining the 3D-Surface Roughness Parameters for a Surface

In determination of the 3D-surface roughness parameters, the surface geometry of the surface is first measured.

For measuring of the surface geometry, a sample sheet, preferably with a size of 100 mm (length)×100 mm (width), is adhered with the surface to be measured facing upwards to an aluminum sheet, preferably having a dimension of 100 mm (length)×100 mm (width)×5 mm (height), to ensure a completely planar lying of the sample sheet. A double-sided adhesive tape can be used in attaching the sample sheet to the aluminum sheet.

The surface geometry of the surface is measured with a 3D-laser measuring confocal microscope Olympus LEXT OLS4000 using the laser modus, a 5× objective lens/magnification with 1× optical zoom, a large-field observation with an image stitching of 25 single images and a measurement area of 1 cm² in the x-y-direction. In conducting the surface geometry measurements, the top and bottom limit of confocal acquisition in z-direction is preferably adjusted manually in the laser modus after adjusting the coarse and fine focus in the live color image modus.

The 3D-surface roughness parameters for the surface are then calculated based on the measured surface geometry with the Olympus LEXT OLS4000 Application Version 2.1.3 software. The 3D-surface roughness parameters are calculated using unfiltered primary dataset obtained from the optical measurements. By "unfiltered data set" is meant that the dataset has not been adapted by using any of the filters characterized by the cutoff lengths $\lambda_s$, $\lambda_c$, or $\lambda_f$.

Preferably, the surface of the contact layer has a 3D-root mean square roughness (Sq) according to EN ISO 25178 of at least 1.0 μm, preferably of at least 2.0 μm, more preferably of at least 4.0 μm, even more preferably of at least 10.0 μm, most preferably of at least 15.0 μm.

Particularly, the 3D-root mean square roughness (Sq) according to EN ISO 25178 of the surface of the contact layer is preferably in the range of 10.0-500.0 μm, more preferably 15.0-400.0 μm, even more preferably 20.0-300.0 μm, and most preferably 25.0-250.0 μm. Particularly preferably the 3D-root mean square roughness (Sq) according to EN ISO 25178 of the surface of the contact layer is in the range of 10.0-300.0 μm, more preferably 15.0-250.0 μm, even more preferably 20.0-200.0 μm, most preferably 30.0-200.0 μm.

Membranes having a 3D-root mean square roughness (Sq) of the surface of the contact layer in the aforementioned range were found to have particularly good concrete adhesion strength.

Preferably, the surface of the contact layer has a 3D-average roughness (Sa) according to EN ISO 25178 of at least 10.0 μm, preferably at least 15.0 μm, more preferably at least 20.0 μm, and most preferably at least 25.0 μm.

Particularly, the 3D-average roughness (Sa) according to EN ISO 25178 of the surface of the contact layer is preferably in the range of 10.0-500.0 μm, more preferably 15.0-400.0 μm, even more preferably 20.0-300.0 μm, and most preferably 25.0-250.0 μm. Particularly preferably the 3D-average roughness (Sa) according to EN ISO 25178 of the surface of the contact layer is in the range of 15.0-300.0 μm, more preferably 20.0-250.0 μm, even more preferably 25.0-200.0 μm, and most preferably 30.0-200.0 μm Membranes having a 3D-average roughness (Sa) of the surface of the contact layer in the aforementioned range were found to have particularly good concrete adhesion strength.

Preferably, the surface of the contact layer has 3D-maximum surface height (Sz) according to EN ISO 25178 of at least 100.0 μm, more preferably of at least 125.0 μm, even more preferably of at least 150.0 μm, most preferably of at least 200.0 μm.

Membranes having a 3D-maximum surface height (Sz) of the surface of the contact layer in the aforementioned ranges were found to have particularly good concrete adhesion strength.

Even more preferably, the surface of the contact layer has a 3D-root mean square roughness (Sq) according to EN ISO 25178 of at least 1.0 μm, preferably of at least 2.0 μm, more preferably of at least 4.0 μm, even more preferably of at least 10.0 μm, most preferably of at least 15.0 μm and a 3D-maximum surface height (Sz) according to EN ISO 25178 of at least 100.0 μm, more preferably of at least 125.0 μm, even more preferably of at least 150.0 μm, most preferably of at least 200.0 μm.

Even more preferably, the surface of the contact layer has a 3D-average roughness (Sa) according to EN ISO 25178 of at least 10.0 μm, preferably at least 15.0 μm, more preferably at least 20.0 μm, and most preferably at least 25.0 μm and 3D-maximum surface height (Sz) according to EN ISO 25178 of at least 100.0 μm, more preferably of at least 125.0 μm, even more preferably of at least 150.0 μm, most preferably of at least 200.0 μm.

Typically, the contact layer contains only small amounts of water before it is contacted with a fresh cementitious composition. Preferably, the amount of water in the contact layer is less than 5.0 wt.-%, preferably less than 3.0 wt.-%, even more preferably less than 1.5 wt.-%, based on the total weight of the contact layer. In particular, the amount of water in the contact layer can be less than 2.0 wt.-%, preferably less than 1.0 wt.-%, even more preferably less than 0.5 wt.-%, based on the total weight of the contact layer.

In case the solid filler component comprises or consists of mineral binders, the mineral binders should remain in substantially non-hydrated state at least until the contact layer is contacted with a composition containing water, such as fresh cementitious composition. Hydration of the mineral binder particles contained in the contact layer would decrease the flexibility and thus deteriorate the handling properties of the contact layer. It would also affect negatively the concrete adhesion strength of the contact layer. It has been found that the mineral binders contained in the contact layer remain in substantially non-hydrated if the contact layer is stored for several weeks at normal room temperature and relative humidity of 50%.

The contact layer may comprise not more than 10.0 wt.-%, preferably not more than 5.0 wt.-% of hydrated mineral binders, based on the total weight of the contact layer. Preferably, the contact layer comprises not more than 2.5 wt.-%, more preferably not more than 1.0 wt.-%, even more preferably not more than 0.5 wt.-%, most preferably not more than 0.1 wt.-% of hydrated mineral binders, based on the total weight of the contact layer.

In order to produce a contact layer containing non-hydrated mineral binders, the solid filler component F containing the mineral binder is preferably mixed with the thermoplastic polymer component P in dry form, i.e. without being mixed with water. Mixing the mineral binder with water would result in initiation of the hydration reactions, which is not desired. The contact layer of the present invention is preferably obtained by melt-processing a composition containing the solid filler component F and the thermoplastic polymer component P to a homogenized melt, which is then further processed into a shaped article. The homogenized melt can be, for example, extruded through a manifold or a flat die followed by cooling the extruded material between calender cooling rolls.

The homogenized melt is preferably obtained by melt-processing a composition comprising the solid filler component F and the thermoplastic polymer component P at a temperature, which is above the melting point of point of the thermoplastic polymer component P. Preferably, the homogenized melt is substantially free of water. In particular, the amount of water in the homogenized melt is less than 5.0 wt.-%, preferably less than 2.5 wt.-%, more preferably less than 1.0 wt.-%, even more preferably less than 0.5 wt.-%, most preferably less than 0.1 wt.-%, based on the total weight of the homogenized melt.

The surface of the contact layer is preferably non-tacky at normal room temperature (25° C.). Whether a surface of a specimen is tacky or not can be determined by pressing the surface with the thumb at a pressure of about 5 kg for 1 second and then trying to lift the specimen by raising the hand. In case the thumb does not remain adhered to the surface and the specimen cannot be raised up, the surface is considered to be non-tacky. In the context of membrane of the present invention, the "specimen" used in the tackiness test refers to a membrane having width of 10 cm and length of 20 cm.

There are no particular restrictions for the thickness of the contact layer. However, membranes with contact layer thickness of above 50 mm are not practical in sealing applications and contact layers with a thickness of below 50 μm have been found to be difficult to produce with the desired mechanical properties. In particular, the contact layer has a thickness of at least 0.1 mm, preferably of 0.1-75.0 mm, more preferably 0.1-25.0 mm, most preferably 0.1-10.0 mm. Preferably, the contact layer has a thickness of 0.1-50.0 mm, preferably 0.2-10.0 mm, more preferably 0.3-5.0 mm, most preferably 0.4-2.0 mm. The thickness of the contact layer is measured according to EN 1849-2 standard.

It is preferable that the contact layer has a certain flexibility to allow it to be wound into rolls, typically during production, and then easily applied to a surface of a substrate. The inventors of the present invention, however, also have found that contact layers with certain flexibility have better concrete adhesion strength. Preferably, the contact layer has a shear modulus at a temperature of 30° C. according to EN ISO 6721-2:2008 of less than 600 MPa, more preferably less than 200 MPa, and most preferably less than 100 MPa.

The contact layer preferably has a mass per unit area of 100-10000 g/m2, more preferably of 200-6000 g/m2, even more preferably of 300-3000 g/m2. The mass per unit area is measured according to EN 1849-2.

The density of the contact layer is preferably 0.25-3.00 g/cm$^3$, particularly 0.30-2.75 g/cm$^3$, more preferably 0.35-2.50 g/cm$^3$, even more preferably 0.40-2.00 g/cm$^3$, most preferably 0.50-1.50 g/cm$^3$. The density of the contact layer is measured by using the buoyancy method.

In order to improve the mechanical properties of the contact layer, it can be advantageous that the contact layer is reinforced with a layer of fiber material bonded to one of its surfaces. The reinforcement layer can be in the form of a fiber mat, a fiber-woven fabric or a fibrous tissue. Particularly suitable materials for the reinforcement layer include glass fibers, polyester fibers or nylon fibers. It may be advantageous that the contact layer comprises a first and second reinforcement layers bonded to the first and second surfaces of the contact layer, respectively.

The preferences given above for the solid filler component F and the thermoplastic polymer component P apply equally to all aspects of the invention.

In another aspect of the present invention, a method for producing a contact layer, as it was described above in detail, is provided. The method for producing a contact layer is not particularly limited and any conventional technology used for producing sheets and films from plastic materials can be used.

The contact layer can be produced by extruding, calendering, compressing or casting a homogenized melt comprising the components of the contact layer.

Preferably, the method for producing a contact layer comprises extruding and/or calendering a homogenized melt comprising the components of the contact layer.

The homogenized melt can be obtained by melt-processing a composition comprising solid filler component F and the thermoplastic polymer component P in an extruder or kneader. The melt-processing is preferably conducted at a temperature that is higher than the melting point of the thermoplastic polymer component P, typically at least 20° C. higher, preferably at least 30° C. higher. Preferably, the amount of water in the homogenized melt is less than 1.0 wt.-%, preferably less than 0.5 wt.-%, most preferably less than 0.1 wt.-%.

Preferably, the thermoplastic polymer component P is melt-processed in an extruder before the solid filler component F is fed into the extruder through a side feeder. Some or all of the components of the composition can also be first mixed in a mixing device to obtain a dry blend, which is then fed into an extruder or kneader. The components of the composition can also be first mixed in a compounding extruder to obtain pellets or granulates, which are then fed into extruder or kneader.

Preferably, the contact layer is produced by an extrusion process. In the extrusion process a homogenized melt comprising the solid filler component F and the thermoplastic polymer component P is extruded through a manifold or a flat, annular, slot or cast die, preferably through a manifold or a flat die and quenching the extruded web of material between calender cooling rolls. The thickness of the produced contact layer can be controlled by die lip adjustment and/or by adjusting the gap size between the calender cooling rolls. Any conventional extruder apparatus used for producing flat film sheet as described in "Kunststoff Verarbeitung" by Schwarz, Ebeling and Furth, $10^{th}$ Edition 2005, Vogel Buchverlag, paragraph 5.7.2 can be used in the extrusion process.

The optimal extrusion temperature depends on the composition of the contact layer and on the desired throughput of the extrusion process. The extrusion temperature is preferably 80-250° C., more preferably 100-240° C., even more preferably 120-220° C., most preferably 140-200° C. The term "extrusion temperature" refers to the temperature of the molten material in the extruder die or manifold. Contact layers extruded at a temperature within the above described temperature ranges were found to provide particularly good concrete adhesion strengths.

Preferably, the extrusion pressure is 20.0-350.0 bar, preferably 30.0-240 bar, more preferably 35.0-200 bar, most preferably 40.0-130.0 bar. The term "extrusion pressure" refers to the pressure of the molten material inside the extruder just before the material enters the extruder die or manifold.

The gap size between the cooling rolls can be wider than the thickness of the produced contact layer. For example, the gap size between the cooling rolls can be 10%, 25%, 50%, or 75% wider than the thickness of the produced contact layer.

The contact layer can also be produced by a calendering process. In the calendering process, a homogenized melt comprising the solid filler component F and the thermoplastic polymer component P is passed between a series of calender rolls, in the course of which the homogenized melt is spread across the width of the rolls, stretched and finally cooled to the form of a film or sheet with defined thickness. The homogenized melt can be fed with an extruder to the top of the calendering section and into the gap between the first and second rolls. Preferably, the calendering section comprises at least four calender rolls. Any conventional calendering apparatus used for producing films or sheets from thermoplastic materials as described in "Kunststoff Verarbeitung" by Schwarz, Ebeling and Furth, $10^{th}$ Edition 2005, Vogel Buchverlag, chapter 3 can be used in the calendering process.

The homogenized melt can comprise, in addition to the solid filler component F and the thermoplastic polymer component P, typical additives used in extrusion and calendering processes such as internal lubricants, slip agents, antiblock agents, denest aids, oxidative stabilizers, melt strength enhancers. The homogenized melt can also further comprise other additives such as UV- and heat stabilizers, plasticizers, foaming agents, dyes, colorants, pigments, matting agents, antistatic agents, impact modifiers, and flame retardants.

According to one embodiment, the homogenized melt comprises, in addition to the solid filler component F and the thermoplastic polymer component P, at least one chemical or physical foaming agent and optionally at least one activator for the foaming agent. Examples of suitable chemical foaming agents include azodicarbonamide, azobisisobutyronitrile, benzenesulphonyl hydrazide, 4,4-oxybenzenesulphonyl semicarbazide, 4,4-oxybis(benzenesulphonyl hydrazide), diphenyl sulphone-3,3-disulphonyl hydrazide, p-toluenesulphonyl semicarbazide, sodium bicarbonate, ammonium carbonate, ammonium bicarbonate, potassium bicarbonate, diazoaminobenzene, diazoaminotoluene, hydrazodicarbonamide, diazoisobutyronitrile, barium azodicarboxylate and 5-hydroxytetrazole. Preferably, the foaming agent is sodium bicarbonate.

The method for producing a contact layer can further comprise a post-treatment step such as brushing and/or sand blasting and/or plasma treatment, in particular air plasma treatment step, to optimize the surface properties of the produced contact layer. The final product is preferably stored in the form of rolls.

In another aspect of the present invention a method for binding two substrates to each other is provided. The substrates can be any objects having a surface, which can be covered with a contact layer.

The method for binding two substrates to each other comprises steps of:
  a) applying a layer of first adhesive on the surface of a first substrate,
  b) covering the layer of the first adhesive with a contact layer according of the present invention such that a first surface of the contact layer is brought in contact with the layer of the first adhesive,
  c) applying a layer of a second adhesive on the second opposite surface of the contact layer and contacting the layer of the second adhesive with the surface of the second substrate or applying a layer of a second adhesive on a surface of the second substrate and contacting the layer of the second adhesive with the second opposite surface of the contact layer
  d) letting the layers of the first and second adhesives to harden.

The first and the second adhesives can be fresh cementitious compositions or synthetic resin compositions, such as epoxy based two-component adhesive or EVA-based adhesive, preferably fresh cementitious compositions.

Preferably, the first and second substrates consist of or comprise material selected from the group consisting of hardened cementitious compositions, wood, plywood, particle board, gypsum board, metal, metal alloy, plastic, thermal insulation material, or a combination thereof.

The substrates can consist of or comprise same material or different material. Preferably, at least one of the substrates consists of hardened concrete.

In another aspect of the present invention a method for waterproofing a substrate is provided. The substrate can be any structural or civil engineering structure, which is to be sealed against moisture and water. The surface of the substrate can be orientated horizontally or not.

The method for waterproofing a substrate comprises steps of
applying a contact layer according to the present invention to a surface of a substrate such that a first surface of the contact layer is directed against the surface of the substrate,
casting a fresh cementitious composition on a second opposing surface of the contact layer, and
hardening the fresh cementitious composition.

Preferably, the fresh cementitious composition is a fresh concrete composition.

The casted cementitious composition after hardening can be part of a structure, in particular, an above-ground or underground structure, for example a building, garage, tunnel, landfill, water retention, pond, dike or an element for use in pre-fabricated constructions.

In another aspect of the present invention a waterproofed construction for waterproofing a substrate against water penetration is provided. The waterproofed construction comprises a layer of concrete and a contact layer according to the present invention arranged between surface of a substrate and the layer of concrete such that the first surface of the contact layer is directed against the surface of the substrate and the second surface of the contact layer is fully bonded to the surface of the layer of concrete.

The term "fully bonded" refers to two surfaces being adhesively joined over the full surface.

The substrate can be any structural or civil engineering structure, which is to be sealed against moisture and water, such as a hardened concrete structure or a subsurface.

In another aspect of the present invention a method for sealing a substrate against water penetration is provided. The method for sealing a substrate against water penetration comprises steps of
applying a layer of adhesive on the surface of the substrate,
covering the layer of the adhesive with a contact layer of the present invention such that one of the surfaces of the contact layer brought in contact with the layer of adhesive, and
hardening the layer of adhesive.

The adhesive can be a fresh cementitious composition or a synthetic resin based adhesive, such as epoxy based two-component adhesive or EVA-based adhesive, preferably a fresh cementitious composition, particularly a fresh concrete or a fresh shotcrete composition.

According to one embodiment, the method for sealing a substrate against water penetration comprises steps of
applying a layer of adhesive on one of the surfaces of a contact layer of the present invention,
covering surface of the substrate with the contact layer such that the layer of adhesive is brought in contact with surface of the substrate, and
hardening the layer of adhesive.

The adhesive can be a fresh cementitious composition or a synthetic resin based adhesive, preferably a fresh cementitious composition.

In another aspect of the present invention a sealed construction for sealing a substrate against water penetration is provided. The sealed construction comprises a contact layer according to the present invention and a layer of adhesive arranged between a surface of the substrate and the contact layer such that one of the surfaces of the contact layer is bonded to the surface of the substrate with the layer of adhesive.

The adhesive can be a fresh cementitious composition or a synthetic resin based adhesive such as epoxy based two-component adhesive or EVA-based adhesive, preferably a fresh cementitious composition, particularly a fresh concrete or shotcrete composition.

In another aspect of the present invention use of the contact layer according to the present invention as a waterproofing membrane is provided.

EXAMPLES

The materials shown in Table 1 were used in the examples.

TABLE 1

Materials used in the experiments

| Trade name | Composition | Provider |
| --- | --- | --- |
| Evatane 18-150 | EVA copolymer with 18 wt.-% vinyl acetate | Arkema |
| Elvax 260A | EVA copolymer with 28 wt.-% vinyl acetate | DuPont |
| Levapren 400 | EVA copolymer with 40 wt.-% vinyl acetate | Lanxess |
| Levapren 700 | EVA copolymer with 70 wt.-% vinyl acetate | Lanxess |
| Levapren 900 | EVA copolymer with 90 wt.-% vinyl acetate | Lanxess |
| Elvaloy AC 2116 | EEA copolymer with 16 wt.-% acrylic acid | DuPont |
| Vistamax 6202 | PP-PE copolymer with 15 wt.-% polyethylene | Exxon Mobile |
| Holcim Optimo 4 | CEM II/B-M (T-LL) 42.5 N SN EN 197-1 cement | LaFargeHolcim |

[a]EVA, ethylene vinyl acetate copolymer
[b]EEA, ethylene acrylic acid copolymer Example 1

For the measurement of the average peel resistances, each contact layer was bonded to a thermoplastic barrier layer to obtain an example membrane, which could be used in the peel resistance test.

Preparation of the Example Membranes

The example membranes EX1-EX9 each comprising a barrier layer and a contact layer were produced with a laboratory scale extrusion-calendering apparatus comprising a flat die and set of water-cooled calender rolls. The layers were extruded with a twin screw extruder (Berstorff GmbH).

For each example membrane (EX), a contact layer (E) was first produced with the extrusion-calendering apparatus after which a barrier layer was extruded and bonded on one surface of the contact layer using the same extrusion-calendering apparatus. A polyethylene-based thermoplastic membrane (WT 1210 HE available from Sika) was used as a barrier layer in all example membranes EX1-EX9.

The extruder part of the apparatus was equipped with a flat die and the melted compositions of the contact layers were extruded without using a die lip. The polymer component of the contact layer was first melt-processed in the extruder at a temperature, which is approximately 30° C. above the melting temperature of the polymer component before the solid filler component was fed into the extruder through a side feeder. The produced contact layers had a thickness of approximately 1.50 mm while the thickness of the barrier layer was approximately 0.5 mm. A melted composition consisting of the constituents of the barrier layer was extruded with a flat die on the surface of each contact layer and the layers were pressed together and cooled between calender cooling rolls.

The operating conditions of the extruder-calender apparatus during producing the example membranes are presented in Table 2 and the compositions of the contact layers (E) of the example membranes EX1-EX9 are presented in Table 3. The extrusion temperature and pressure were measured at a point, where the melted mass entered the flat die. The temperature of the cooling rolls was approximately 20° C. during the production period.

TABLE 2

Operating conditions of the extrusion process

| Contact layer | Extrusion pressure [bar] | Extrusion temperature [° C.] | Extrusion flux [kg/h] | Roller gap [mm] | Roller speed [m/min] |
|---|---|---|---|---|---|
| E1 | 72 | 160 | 12 | 3.00 | 0.49 |
| E2 | 53 | 160 | 12 | 3.00 | 0.52 |
| E3 | 83 | 160 | 12 | 3.00 | 0.5 |
| E4 | 77 | 160 | 12 | 3.00 | 0.47 |
| E5 | 65 | 160 | 12 | 3.00 | 0.51 |
| E6 | 79 | 160 | 12 | 3.00 | 0.53 |
| E7 | 59 | 160 | 12 | 3.00 | 0.5 |
| E8 | 59 | 160 | 13 | 3.00 | 0.5 |
| E9 | 58 | 160 | 13 | 3.00 | 0.51 |
| Barrier layer | 61 | 160 | 10 | 1.80 | 0.78 |

Preparation of Concrete Test Specimen

Three sample membranes with a dimension of 200 mm (length)×50 mm (width) were cut from each of the example membranes EX1-EX9 produced as described above. The sample membranes were placed into formworks having a dimension of 200 mm (length)×50 mm (width)×30 mm (height) with the contact layer facing upwards and with the barrier layer against the bottom of the formwork.

One edge of each sample membrane on the side of the contact layer was covered with an adhesive tape having a length of 50 mm and width coinciding with the width of the membrane sample to prevent the adhesion to the hardened concrete. The adhesive tapes were used to provide easier installation of the test specimens to the peel resistance testing apparatus.

For the preparation of concrete specimens a batch of fresh concrete formulation was prepared. The fresh concrete formulation was obtained by mixing 8.9900 kg of a concrete dry batch of type MC 0.45 conforming to EN 1766 standard, 0.7553 kg of water and 0.0202 kg of Sikament-12S for five minutes in a tumbling mixer. The concrete dry batch of type MC 0.45 contained 1.6811 kg of CEM I 42.5 N cement (Normo 4, Holcim), 7.3089 kg of aggregates containing 3% Nekafill-15 (from KFN) concrete additive (limestone filler), 24% sand having a particle size of 0-1 mm, 36% sand having a particle size of 1-4 mm, and 37% gravel having a particle size of 4-8 mm. Before blending with water and Sikament-12S the concrete dry batch was homogenized for five minutes in a tumbling mixer.

The formworks containing the sample membranes were subsequently filled with the fresh concrete formulation and vibrated for two minutes to release the entrapped air. After hardening for one day the test concrete specimens were stripped from the formworks and stored under standard atmosphere (air temperature 23° C., relative air humidity 50%) before measuring the peel resistances.

Measurement of Peel Resistances

The measurement of peel resistances of sample membranes from hardened concrete specimen was conducted in accordance with the procedure laid out in the standard DIN EN 1372:2015-06. A Zwick Roell AllroundLine Z010 material testing apparatus equipped with a Zwick Roell 90°-peeling device (type number 316237) was used for conducting the peel resistance measurements.

For the peel resistance measurements, a concrete specimen was clamped with the upper grip of the material testing apparatus for a length of 10 mm at the end of the concrete specimen comprising the taped section of the sample membrane. Following, the sample membrane was peeled off from the surface of the concrete specimen at a peeling angle of 90° and at a constant cross beam speed of 100 mm/min. During the measurements the distance of the rolls was approximately 570 mm. The peeling of the sample membrane was continued until a length of approximately 140 mm of the sample membrane was peeled off from the surface of the concrete specimen. The values for peel resistance were calculated as average peel force per width of the sample membrane [N/50 mm] during peeling over a length of approximately 70 mm thus excluding the first and last quarter of the total peeling length from the calculation.

The average peel resistance values for the example membranes EX1-EX9 presented in Table 3 have been calculated as an average of measured values obtained with three sample membranes cut from the same example membrane.

TABLE 3

Compositions of the contact layers and measured peel resistances

| Contact layer | EX1 | EX2 | EX3 | EX4 | EX5 | EX6 | EX7 | EX8 | EX9 |
|---|---|---|---|---|---|---|---|---|---|
| Polymer component | | | | | | | | | |
| Elvax 260 A [wt.-%] | 10.5 | | | 10.5 | 10.5 | | | 25 | |
| Evatane 18-150 [wt.-%] | | 10.5 | | | | | 10.5 | | |

TABLE 3-continued

Compositions of the contact layers and measured peel resistances

| Contact layer | EX1 | EX2 | EX3 | EX4 | EX5 | EX6 | EX7 | EX8 | EX9 |
|---|---|---|---|---|---|---|---|---|---|
| Elvaloy AC 2116 [wt.-%] | | | 10.5 | | | | | | |
| Levapren 400 [wt.-%] | 39.5 | 39.5 | 39.5 | | | 50 | | | |
| Levapren 700 [wt.-%] | | | | 39.5 | | | 39.5 | | |
| Levapren 900 [wt.-%] | | | | | 39.5 | | | 25 | 25 |
| Vistamaxx 6202 [wt.-%] | | | | | | | | | 25 |
| Solid filler component | | | | | | | | | |
| Holcim optimo 4 [wt.-%] | 50 | 50 | 50 | 50 | 50 | 50 | 50 | 50 | 50 |
| Peel resistance | | | | | | | | | |
| 1 day [N/50 mm] | 14.9 | 27.8 | 15.2 | 54.7 | 97.2 | 44.4 | 75.8 | 64.1 | 36.1 |
| 7 days [N/50 mm] | 86.7 | 83.3 | 100.3 | 82.7 | 152.9 | 109.2 | 104.5 | 136.0 | 54.4 |
| 28 days [N/50 mm] | 105.8 | 105.2 | 108.1 | 92.4 | 169.1 | 124.0 | 124.2 | 134.6 | 98.2 |

Example 2

3D-average roughness (Sa), 3D-root mean square roughness (Sq), and 3D-maximum surface height (Sz) according to EN ISO 25178 standard were determined for the surfaces of contact layers E10-E15.

For the measurement of the average peel resistances, each contact layer was bonded to a thermoplastic barrier layer to obtain an example membrane (EX10-EX15), which could be used in the peel resistance test.

The example membranes were produced as described above in Example 1 by using an extruder-calender apparatus. A polyethylene-based thermoplastic membrane (WT 1210 HE available form Sika) was used as a thermoplastic barrier layer in all example membranes. The operating conditions of the extruder-calender apparatus during producing the example membranes are presented in Table 4 and the compositions of the contact layers (E) of the example membranes EX10-EX15 are presented in Table 5. The extrusion temperature is the temperature of the melted mass in the flat die and the extrusion pressure was measured at a point, where the melted mass entered the flat die. The temperature of the cooling rolls was approximately 20° C. during the production period. The peel resistances form hardened concrete specimens were determined as described above in Example 1.

For measuring the surface geometry of the contact layers, a sample membrane with a size of 100 mm (length)×100 mm (width) was cut from each example membrane and adhered to an aluminum sheet having a dimension of 100 mm (length)×100 mm (width)×5 mm (height), with the contact layer facing upwards, to ensure a completely planar lying of the sample. A double-sided adhesive tape was used in attaching the sample to the aluminum sheet.

The surface geometry of each contact layer was measured with a 3D-laser measuring confocal microscope Olympus LEXT OLS4000 using the laser modus, a 5× objective lens/magnification with 1× optical zoom, a large-field observation with an image stitching of 25 single images and a measurement area of 1 cm2 in the x-y-direction. In conducting the surface geometry measurements, the top and bottom limit of confocal acquisition in z-direction was adjusted manually in the laser modus after adjusting the coarse and fine focus in the live color image modus.

The 3D-surface roughness parameters were calculated from the measured surface geometry with the attached Olympus LEXT OLS4000 Application Version 2.1.3 software. The 3D-surface roughness parameters were calculated by using unfiltered primary dataset obtained from the optical measurements without using any of the cutoff lengths λs, λc, or λf. The 3D-surface roughness parameters shown in Table 5 have been obtained as average from at least two measurements conducted at different locations on the surface of a contact layer of each sample membrane.

TABLE 4

Operating conditions of the extrusion process

| Contact layer | Extrusion pressure [bar] | Extrusion temperature [° C.] | Extrusion flux [kg/h] | Roller gap [mm] |
|---|---|---|---|---|
| E10 | 56 | 175 | 13 | 2.6 |
| E11 | 94 | 190 | 14 | 3.0 |
| E12 | 57 | 220 | 16 | 3.0 |
| E13 | 93 | 185 | 16 | 3.0 |
| Barrier layer | 61 | 160 | 10 | 1.8 |

TABLE 5

Compositions, peel resistances and 3D-roughness parameters

| Contact layer | EX 10 | EX 11 | EX 12 | EX 13 |
|---|---|---|---|---|
| Polymer component | | | | |
| Elvax 260 A [wt.-%] | 13.1 | 13.1 | 13.1 | 13.1 |
| Levapren 400 [wt.-%] | 12.3 | 12.3 | 12.3 | 12.3 |
| *Additives | 12.9 | 12.9 | 12.9 | 12.9 |
| Solid filler component | | | | |
| Holcim optimo 4 [wt.-%] | 60 | 60 | 60 | 60 |
| 3D-surface roughness | | | | |
| Sa [μm] | 35.8 | 111.0 | 115.5 | 126.1 |
| Sq [μm] | 44.1 | 142.1 | 146.5 | 160.7 |
| Sz [μm] | 524.3 | 1265.4 | 978.0 | 1118.3 |
| Peel resistance | | | | |
| 28 days [N/50 mm] | 68.0 | 75.0 | 79.8 | 91.0 |

*Paraloid KM370, Antioxidant 1010, Loxiol 93P, Tinuvin 783FDL

The invention claimed is:

1. A contact layer comprising a solid filler component F and a thermoplastic polymer component P, wherein the amount of the solid filler component F is 10.0-90.0 wt.-% based on the total weight of the contact layer, and the solid filler component F comprises at least one mineral binder selected from hydraulic binders,
  wherein the contact layer comprises not more than 2.5 wt.-% of hydrated mineral binders, based on the total weight of the contact layer, wherein the thermoplastic polymer component P comprises at least one polymer selected from the group consisting of ethylene-vinyl acetate co-polymers (EVA), ethylene-acrylic ester copolymers, ethylene-α-olefin co-polymers, ethylene-propylene co-polymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB), and mixtures thereof, and wherein a surface of the contact layer has a 3D-average roughness (Sa) according to EN ISO 25178 of at least 10.0 μm.

2. The contact layer according to claim 1, wherein the solid filler component F contains at least 60.0 wt.-% of mineral binders.

3. The contact layer according to claim 1, wherein the contact layer has a concrete adhesion strength of at least 10 N/50 mm.

4. The contact layer according to claim 1, wherein the solid filler component F further comprises at least one mineral binder selected from the group consisting of, non-hydraulic binders, latent hydraulic binders, and pozzolanic binders, and mixtures thereof.

5. The contact layer according to claim 1, wherein the amount of the thermoplastic polymer component P is 10.0-90.0 wt.-%, based on the total weight of the contact layer.

6. The contact layer according to claim 1, wherein the contact layer has a thickness of 0.1-50.0 mm.

7. The contact layer according to claim 1 obtainable by extruding a homogenized melt comprising the solid filler component F and the thermoplastic polymer component P through a manifold or a flat die followed by cooling the extruded material between calender cooling rolls.

8. The contact layer according to claim 7, wherein the homogenized melt is obtainable by melt-processing a composition comprising the solid filler component F and the thermoplastic polymer component P at a temperature, which is above the melting point of point of the thermoplastic polymer component P.

9. The contact layer according to claim 7, wherein the amount of water in the homogenized melt is less than 1.0 wt.-%.

10. The contact layer according to claim 1 wherein a mass per unit are of the contact layer is in a range of from 300 to 3000 g/m².

11. The contact layer according to claim 1 wherein an amount of the thermoplastic polymer component P is >20 wt.-%.

12. The contact layer according to claim 1, wherein the thermoplastic polymer component P consists of at least one polymer selected from the group consisting of ethylene-vinyl acetate co-polymers (EVA), ethylene-acrylic ester copolymers, ethylene-α-olefin co-polymers, ethylene-propylene co-polymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB), and mixtures thereof.

13. The contact layer according to claim 1, wherein
a surface of the contact layer has a 3D-root mean square roughness (Sq) according to EN ISO 25178 of at least 1.0 μm, and
a surface of the contact layer has 3D-maximum surface height (Sz) according to EN ISO 25178 of at least 100.0 μm.

14. A method producing a contact layer according to claim 1, wherein the method comprises extruding a homogenized melt comprising the solid filler component F and the thermoplastic polymer component P through a manifold or a flat die followed by cooling the extruded material between calender cooling rolls.

15. The method according to claim 14, wherein the extrusion temperature is 80-250° C., and wherein the extrusion pressure is 20.0-350.0 bar.

16. A method for binding substrates to each other, the method comprising:
a) applying a layer of first adhesive on the surface of a first substrate,
b) covering the layer of the first adhesive with a contact layer according to claim 1 such that a first surface of the contact layer is brought in contact with the layer of the first adhesive,
c) applying a layer of a second adhesive on the second opposite surface of the contact layer and contacting the layer of the second adhesive with the surface of the second substrate or applying a layer of a second adhesive on a surface of the second substrate and contacting the layer of the second adhesive with the second opposite surface of the contact layer,
d) hardening the layers of the first and second adhesives, wherein at least one of the first and second adhesives is a fresh cementitious composition or a synthetic resin composition.

17. A method for waterproofing a substrate, the method comprising:
applying a contact layer according to claim 1 to a surface of a substrate such that a first surface of the contact layer is directed against the surface of the substrate,
casting a fresh cementitious composition on a second opposing surface of the contact layer, and
hardening the fresh cementitious composition.

18. A waterproofed construction comprising a layer of concrete and a contact layer according to claim 1 arranged between a surface of a substrate and the layer of concrete such that the first surface of the contact layer is directed against the surface of the substrate and the second surface of the contact layer is fully bonded to the layer of concrete.

19. A method for sealing a substrate against water penetration, the method comprising:
applying a layer of adhesive on the surface of the substrate,
covering the layer of the adhesive with a contact layer according to claim 1 such that one of the surfaces of the contact layer is brought in contact with the layer of adhesive, and
hardening the layer of adhesive.

20. A sealed construction comprising a contact layer according to claim 1 and a layer of adhesive arranged between a surface of a substrate and the contact layer such that one of the surfaces of the contact layer is bonded to the surface of the substrate with the layer of adhesive.

21. A method comprising applying the contact layer according to claim 1 as a waterproofing membrane.

22. A contact layer comprising a solid filler component F and a thermoplastic polymer component P, wherein the amount of the solid filler component F is 10.0-90.0 wt.-% based on the total weight of the contact layer, and the solid filler component F comprises at least one mineral binder selected from hydraulic binders,
wherein the contact layer comprises not more than 2.5 wt.-% of hydrated mineral binders, based on the total weight of the contact layer, wherein the thermoplastic polymer component P comprises at least one polymer selected from the group consisting of ethylene-vinyl acetate co-polymers (EVA), ethylene-acrylic ester copolymers, ethylene-α-olefin co-polymers, ethylene-propylene co-polymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB), and mixtures thereof, and wherein a surface of the contact layer has a 3D-root mean square roughness (Sq) according to EN ISO 25178 of at least 1.0 µm.

23. A contact layer comprising a solid filler component F and a thermoplastic polymer component P, wherein the amount of the solid filler component F is 10.0-90.0 wt.-% based on the total weight of the contact layer, and the solid filler component F comprises at least one mineral binder selected from hydraulic binders, wherein the contact layer comprises not more than 2.5 wt.-% of hydrated mineral binders, based on the total weight of the contact layer, wherein the thermoplastic polymer component P comprises at least one polymer selected from the group consisting of ethylene-vinyl acetate co-polymers (EVA), ethylene-acrylic ester copolymers, ethylene-α-olefin co-polymers, ethylene-propylene co-polymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB), and mixtures thereof, and wherein a surface of the contact layer has 3D-maximum surface height (Sz) according to EN ISO 25178 of at least 100.0 µm.

* * * * *